J. R. DOWLING & J. P. SQUIRES.
SLIP FILE AND BINDER AND PUNCH THEREFOR.
APPLICATION FILED MAY 25, 1908.

915,569.

Patented Mar. 16, 1909.
3 SHEETS—SHEET 1.

Witnesses
Inventors
J. R. Dowling & J. P. Squires
By
Attorneys

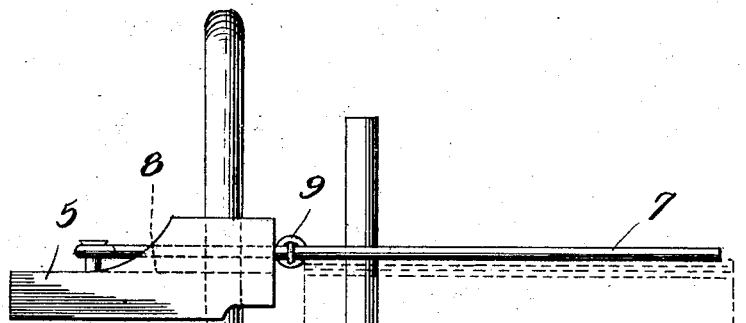
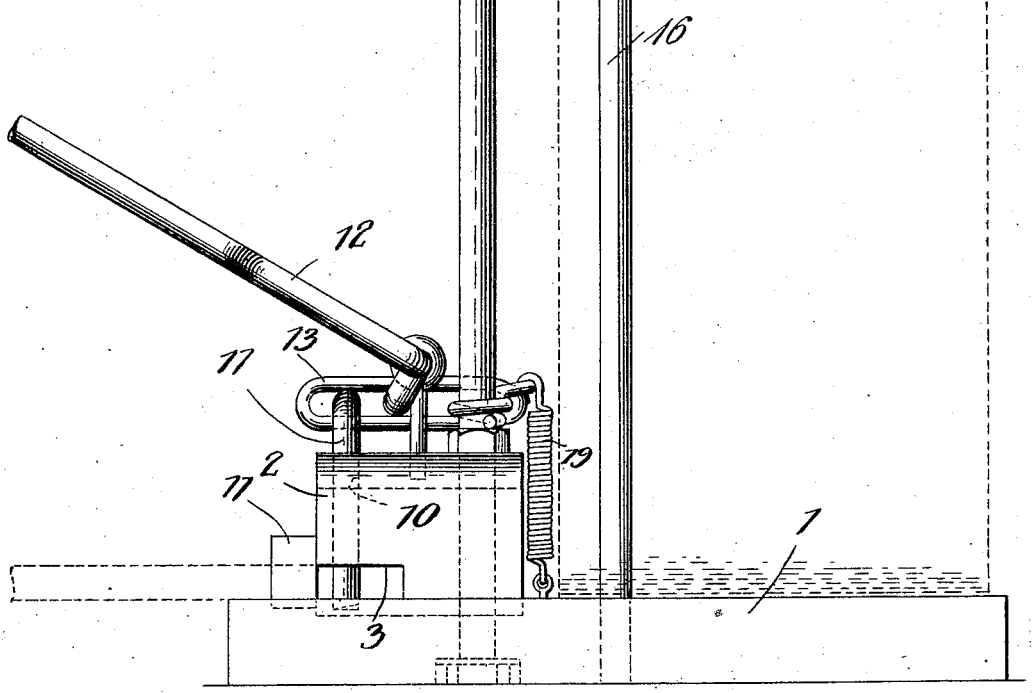

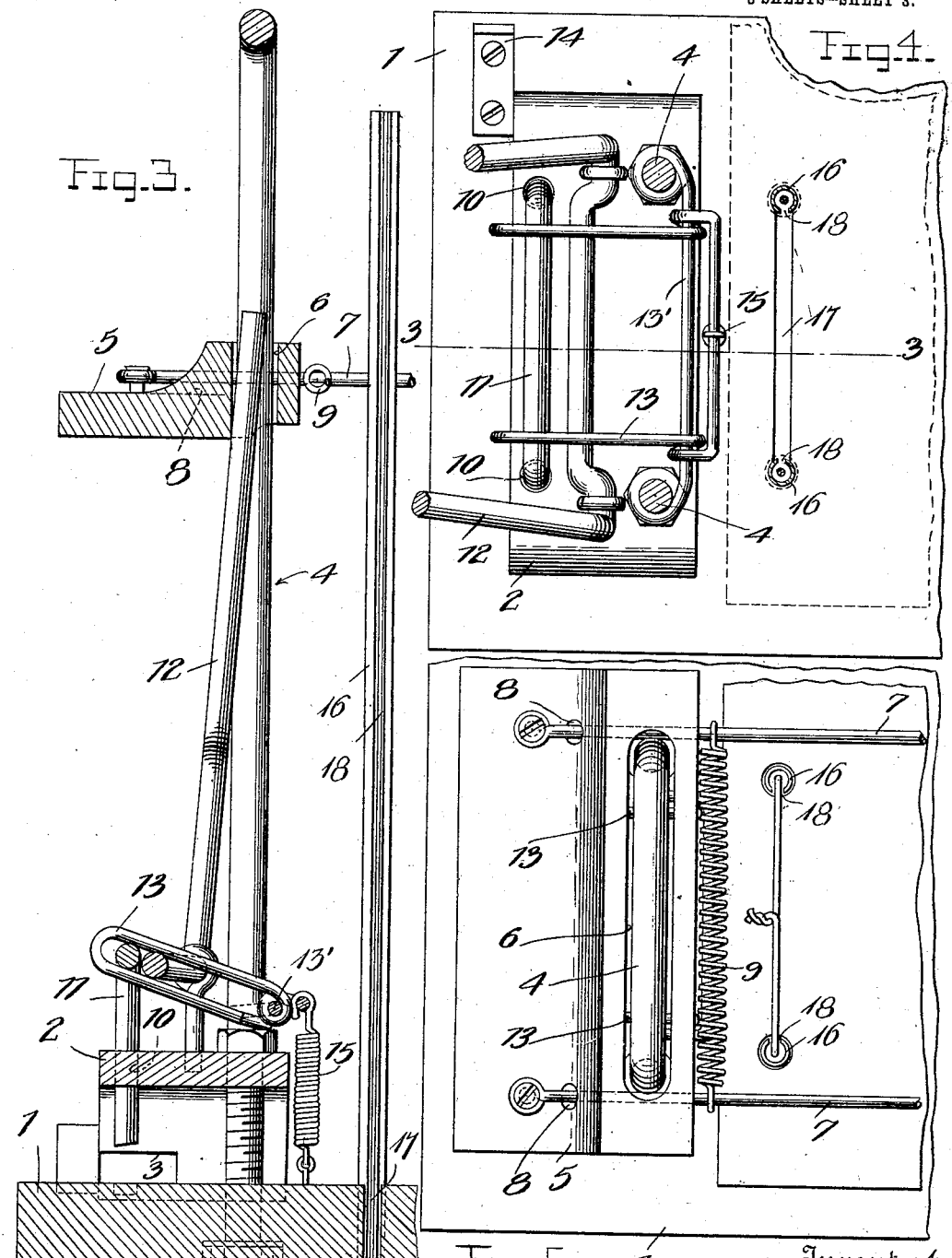

UNITED STATES PATENT OFFICE.

JOHN R. DOWLING AND JOHN P. SQUIRES, OF FORT COLLINS, COLORADO.

SLIP FILE AND BINDER AND PUNCH THEREFOR.

No. 915,569.　　　Specification of Letters Patent.　　Patented March 16, 1909.

Application filed May 25, 1908. Serial No. 434,850.

*To all whom it may concern:*

Be it known that we, JOHN R. DOWLING and JOHN P. SQUIRES, citizens of the United States, residing at Fort Collins, in the county of Larimer and State of Colorado, have invented certain new and useful Improvements in Slip Files and Binders and Punches Therefor; and we do declare the following to be a full, clear, and exact description of the invention, such as will enable others skilled in the art to which it appertains to make and use the same.

Our invention relates to certain improvements in combined slip files and binders, and punches therefor.

It has for its object to provide for carrying out the aforesaid purpose in a simple, effective and expeditious manner, also to provide substantially common means for punching slips and wiring them in order for binding and subsequent filing away. Also, to provide means for carrying out these ends.

With these and other objects in view, the invention consists of certain novel features of construction, combination and arrangement of parts as will be described and particularly pointed out in the appended claims.

Figure 1:
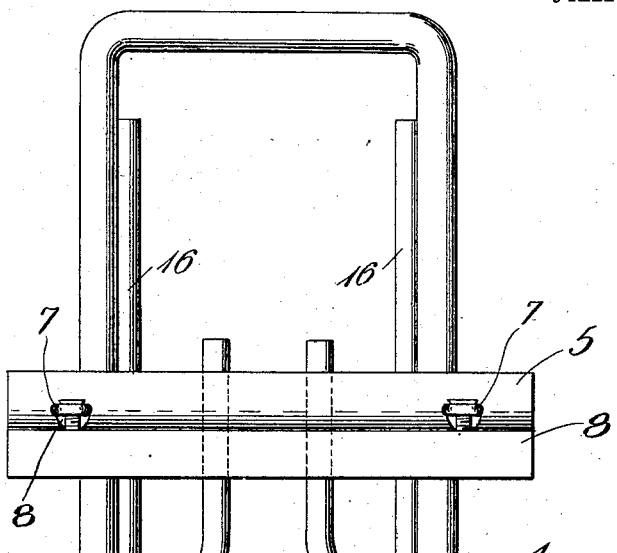
Figure 1:
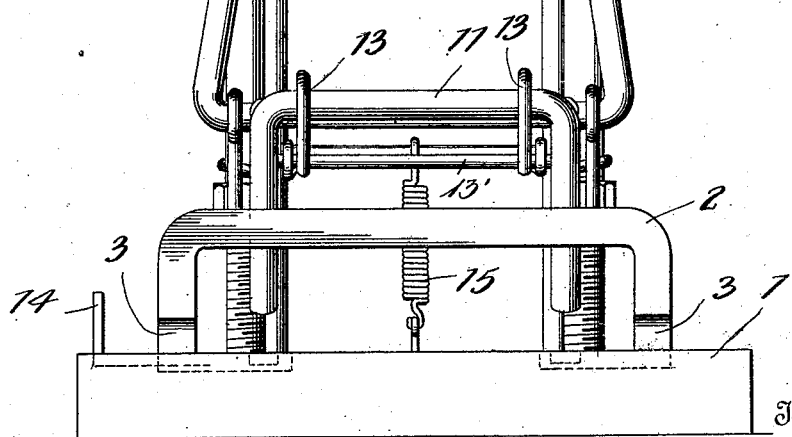

In the accompanying drawings, illustrating the preferred embodiment of our invention, Figure 1 is a front elevation of the device forming the punching feature thereof; Fig. 2 is a side elevation; Fig. 3 is a vertical transverse sectional view of the same; Fig. 4 is a horizontal sectional view taken just above the punch actuating lever and adjunctive parts; and Fig. 5 is a view showing the device more especially in plan view as a binder.

In carrying out our invention we provide a suitable base, 1, upon which is suitably secured a guide or member, 2, having undercut lateral slots or ways, 3, to receive the slips being punched, as hereinafter seen. Upon the upper surface of said guide is suitably secured or formed therewith an upright frame, 4, for holding a board or weight, 5, the latter having a longitudinal slot, 6, therethrough, receiving said frame. Said board or weight has pivoted to its upper surface parallel rods or levers, 7, passing through transverse passages, 8, in said board, and having applied thereto a spring 9, the tendency of which is to move said rods toward each other and in contact with the lateral bars or rods of said upright frame, and thus provide for frictionally holding said slide or board temporarily in elevated position, the purpose of which is apparent. Said guide or member 2 has passing laterally through vertical apertures, 10, thereof, a punch or inverted frame-like member, 11, with its vertical portions adapted each to serve as a punch for perforating or puncturing slips, such, for instance, as are commonly used by banks or for other purposes.

A lever, 12, of general bail-like construction has its arms near the cross connecting bar thereof fulcrumed in eye-ended studs or screws screwed into the guide or member, 2. Said cross connecting piece of the lever 12 passes intermediately of the parallel or opposed looped arms of a supplemental bail-like lever, 13, preferably pivoted by being looped around a cross rod, 13', itself fastened to the lateral bars of the upright frame by being looped around the latter. The cross connecting bar of said lever is depressed at an angle with relation to the lateral bars or arms of said lever so as to have a cam action upon said supplemental lever, said supplemental lever having its lateral looped arms receiving the punch, whereby by depressing the lever, 12, said supplemental lever will be caused to actuate and depress said punch as in effecting the punching or perforating of the slips placed in the line of movement of the punching members proper of said punch for producing duplicate perforations in said slip, as usually practiced in carrying out such purpose.

A gage or stop, 14, preferably of suitable right-angular-like construction, is slidably or adjustably held upon the base 1 and preferably in a depression in the latter to provide for gaging or disposing the slip when being inserted for perforating by said punch.

It will be noted that by suitably inserting the slip or slips as above designated in the guide member, 2, in the path of the movement of the punch, with the lever 12 in elevated position, and by then depressing said lever, that the operation of punching said slip will be effected, when, of course, by again elevating said lever, the punch may be readily disengaged from the slip and the slip accordingly be removed for suitable disposition.

The supplemental lever 13 is subjected to the action of a spring, 15, preferably of the coiled or helical type, for elevating the lever, 12, into position out of the way when not in use, said spring being suitably connected to the base 1, and to said supplemental lever.

16 represents parallel tubular rods suitably let into a transverse slot, 17, in the base, 1, and from which said tubular rods or members may be readily removed after use. Said tubular rods have longitudinal slits or openings, 18, the purpose of which will presently appear. Upon these rods are filed in the usual manner the slips as before indicated in effecting the temporary binding of the same, and after the filing of the requisite number of said slips, the same may be removed. It will be noted that as the slips are filed away upon said rod members, the weight of the board with its rods previously referred to, serves to hold said slips effectively in place upon said rods 16, as above intimated. Also, that the binding wire for securing these slips together when removed from the tubular rods, is passed upwardly through the lower ends of said rods and out through the slits of said rods for their disengagement from said rod when removing the slips from said rods.

It will be noted from the above described combination and arrangement of parts that we provide a common means as a file and binder, together with the punch for perforating said slips in filing the same upon the device before final disposition of said slips, all of which being carried out in a simple, expeditious and effective manner.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described our invention, what we claim as new and desire to secure by Letters-Patent, is:

1. A device of the class described comprising a guide member adapted to receive slips thereunder, a punch loosely arranged in said guide member, a lever pivoted upon said guide member, a supplemental lever interposed between said first lever and said punch adapted to be operated to actuate said punch.

2. A device of the class described, embracing a guide adapted to receive slips for perforation, a punch adapted to be moved in the said guide, a lever pivoted upon said guide, a supplemental lever having engagement with said punch, and a spring connected to said supplemental lever for elevating the first referred to lever out of the way when not in use.

3. A device of the character described embracing a guide member having lateral guide-ways or slots, a punch passing through said guide member, a lever suitably pivoted in position, a supplemental lever having connection with said punch and receiving cam action from the first referred to lever, and a spring connected to said supplemental lever for raising said first lever.

4. A device of the class described embracing a guide member adapted to receive slips or like objects, a punch movably arranged in connection with said guide member, a lever pivoted upon said guide member, a supplemental lever engaged by the cross bar of the first referred to lever, said first referred to lever having a cam action thereon, and an upright frame having the fulcrum of said supplemental lever connected thereto.

5. A device of the character described embracing an upright frame including lateral rods, a board or platen having said upright frame passing therethrough, and said platen or board being equipped with opposing rods or bars pivoted to said platen and held under spring action for engagement with the lateral rods of said upright frame.

6. A device of the character described embracing an upright frame including lateral rods, a platen or board having said upright frame passing therethrough, opposed parallel rods pivoted to said board or platen and passing through passages in said board or platen, and resilient means holding said rods in frictional contact with the lateral bars or rods of said upright frame.

In testimony whereof we have hereunto set our hands in presence of two subscribing witnesses.

JOHN R. DOWLING.
JOHN P. SQUIRES.

Witnesses:
EDNA D. SQUIRES,
GEORGE BEST CRISSMAN.